(12) United States Patent
Lakhotia

(10) Patent No.: US 11,556,639 B2
(45) Date of Patent: Jan. 17, 2023

(54) METHOD FOR AUTOMATIC CREATION OF MALWARE DETECTION SIGNATURE

(71) Applicant: UNIVERSITY OF LOUISIANA AT LAFAYETTE, Lafayette, LA (US)

(72) Inventor: Arun Lakhotia, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 248 days.

(21) Appl. No.: 16/816,972

(22) Filed: Mar. 12, 2020

(65) Prior Publication Data

US 2020/0293656 A1 Sep. 17, 2020

Related U.S. Application Data

(60) Provisional application No. 62/817,805, filed on Mar. 13, 2019.

(51) Int. Cl.
*G06F 21/56* (2013.01)
*G06F 11/36* (2006.01)

(52) U.S. Cl.
CPC .......... *G06F 21/56* (2013.01); *G06F 11/3604* (2013.01)

(58) Field of Classification Search
CPC .... G06F 21/56; G06F 11/3604; G06F 21/564; H04L 9/3247; H04L 63/1416
See application file for complete search history.

(56) References Cited

U.S. PATENT DOCUMENTS

| | | | |
|---|---|---|---|
| 2006/0107321 A1* | 5/2006 | Tzadikario | H04L 63/1425 726/22 |
| 2011/0041179 A1* | 2/2011 | St Hlberg | G06F 21/566 726/23 |
| 2019/0073476 A1* | 3/2019 | Sun | G06F 21/564 |
| 2019/0199736 A1* | 6/2019 | Howard | G06N 20/00 |
| 2019/0228151 A1* | 7/2019 | Schmugar | H04L 63/145 |

FOREIGN PATENT DOCUMENTS

WO 2014110281 A1 7/2014

* cited by examiner

*Primary Examiner* — Ali S Abyaneh

(74) *Attorney, Agent, or Firm* — Kean Miller LLP; Russel O. Primeaux; Jessica C. Engler

(57) ABSTRACT

Herein disclosed is a method for automatically extracting signatures for malware. The method takes advantage of a fundamental economic requirement of malware authors: they must reuse code to manage the time investment. The method disclosed finds shared code between malware and generates signatures from the code. A method is also disclosed for separating code that is found predominantly, if not exceptionally, in malware from code that may be found in benign program.

19 Claims, 6 Drawing Sheets

METHOD FOR AUTOMATIC CREATION OF MALWARE DETECTION SIGNATURE

CROSS REFERENCE TO A RELATED APPLICATION

This application claims priority to U.S. Provisional Patent Application No. 62/817,805, titled "Method for Automatic Creation of Malware Detection Signature", having a priority date of Mar. 13, 2019.

STATEMENT REGARDING FEDERALLY SPONSORED RESEARCH OR DEVELOPMENT

Not applicable.

REFERENCE TO A "SEQUENCE LISTING", A TABLE OR A COMPUTER PROGRAM

Not applicable.

DESCRIPTION OF THE DRAWINGS

The drawings constitute a part of this specification and include exemplary examples of the METHOD FOR AUTOMATIC EXTRACTION OF MALWARE SIGNATURES, which may take the form of multiple embodiments. It is to be understood that, in some instances, various aspects of the invention may be shown exaggerated or enlarged to facilitate an understanding of the invention. Therefore, drawings may not be to scale. For the purposes of clarity, not every component may be labeled in every drawing.

Figure 1:
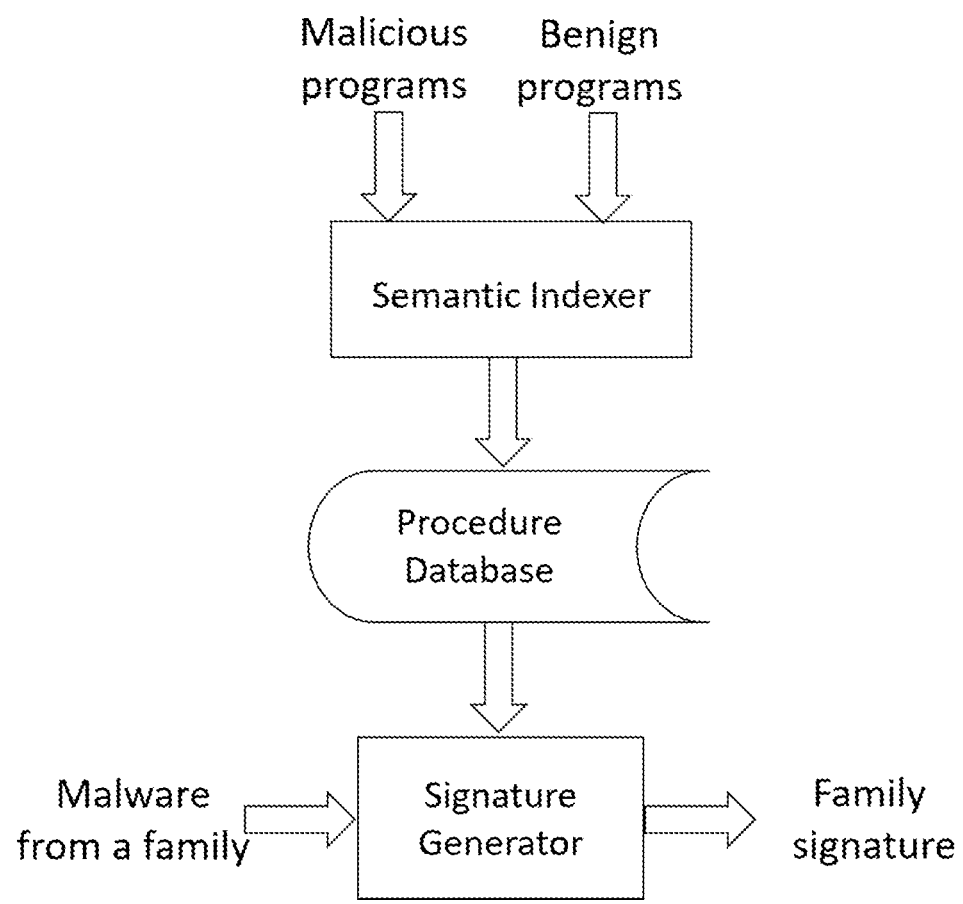
FIG. 1 provides a diagram of the system architecture of the disclosed method.

It should be understood at the outset that, although exemplary embodiments are illustrated in the figures and described below, the principles of the present disclosure may be implemented using any number of techniques, whether presently known or not. The present disclosure should in no way be limited to the exemplary implementations and techniques illustrated in the drawing and described below.

FIELD OF THE INVENTION

The field of this invention generally relates to detecting and protecting computer systems against malware. More particularly, this invention relates to the creation of malware signatures in order to identify malware families and more quickly detect and defend against malware using those families and signatures.

BACKGROUND OF THE INVENTION

Computer programs are an integral part of today's world. Computer programs, which run on a computer under the control of an operating system, are created through scripted source code, drafted in one or more computer programming languages. Along with the rise of programming languages and computer programs has come the proliferation of malware. Malware is a computer program designed to disrupt the ordinary operation of a computer program, typically for undesired or nefarious purposes (e.g., adware, viruses, worms, ransomware, keyloggers, spyware, malicious, BHOs, rootkits, dialers, or rogue security programs).

In the early 1980s, the number of new malware found "in-the-wild" hovered in the 10s of thousands per year. Today's industry leaders report close to a half million new malware every single day. While past malware attackers were mostly young teens or unemployed or unoccupied adults, today nation-states' have teams of computer programmers and hackers dedicated to developing malware and defending against same. Whereas attacks in the past were more annoying than painful, today's attacks can ruin the financial security of individuals, wipe out a business's assets, and/or seriously impact a nation's security.

This dramatic shift in the malware landscape has radically changed the malware industry. In the past, it was sufficient to merely have an anti-virus program guard one's personal machine. Today, though organizations have anti-virus, they must also be aware that anti-virus cannot withstand attacks by a persistent adversary. Thus, a targeted organization must—in addition to anti-virus—have a large security operations center that constantly monitors its computers and network to detect if it has already been breached.

Those experienced in the art are well aware that various new requirements are imposed on malware analysis today. Malware analysts today frequently extract "Indicators of Compromise" ("IoCs") to detect and block a successful attack. Analysts study malware to determine the actor behind it (i.e., the attribution), which is important knowledge needed by law enforcement and for any diplomatic and military engagements across borders. Further, malware analysts must also actively track threats as they are developed and shared across the dark web in efforts to stay ahead of the attacker. The analysts also hunt for evidence of infiltration in their network by looking for indications of certain attackers being Advanced Persistent Threats ("APT"s). Despite the persistent threat and nature of today's threat landscape, there have only been incremental improvements in the technologies available to malware analysts.

At its core, malware analyst technologies can be classified into four categories: (a) anti-malware scanners; (b) anti-malware sandboxes; (c) disassemblers; and (d) reputation databases. Anti-malware scanners use "signatures" to scan a file, drive, computer, or network traffic to search for malware. Anti-malware sandboxes provide a safe environment to "detonate" a suspicious program or document, observe its behavior, and extract information that may then be utilized to detect the presence of a malware on a machine or on the network. Disassemblers enable analysts to review and understand the malware code. Reputation databases maintain knowledge gained from scanners, sandboxes, disassemblers, and human analysis to maintain a database of blacklist and whitelist of known computer programs.

In spite of these tools, bulk of the malware analysis is performed manually by human analysts. While there exists automated (machine learning) methods for creating signatures to determine whether a suspicious file is malicious, the current methods in the art are insufficient to answer the many other questions analysts must investigate. As a result, today's analysts must manually analyze malware to create signatures to detect an APT (Advanced Persistent Threat), attribution, determine a malware's family, and/or extract the indicators from the malware. Though there have been a growth of threat exchanges to enable analysis to share signatures and indicators, the information must first be created manually by analysts.

Fortunately for analysts, malware are sophisticated programs, and are consequently expensive to write. Hence, like any other software developer, malware authors must also develop their program incrementally using reusable and share code components. It is also not economical, practical, or conceivable for anyone to use a malware program just once and recoup their investment. Even wealthy nation-states must at the minimum test their malware to ensure it performs as desired, and thus must use them in whole or in part in a live environment, which then creates a pathway for their malware code to reach malware analysts prior to the use of the malware in a real campaign. Even once they have perfected their malware weapons, it is practical and pragmatic for even the wealthy nation-states to use them in multiple campaigns. Thus, analysts can get access to the malware code after its first use in a campaign.

As a consequence of malware economics, the high volume of new malware reported in the industry is frequently reworked versions of previously existing malware, and not brand new, never-before-seen code. These variations are created in the normal process of program evolution. For example, since its first release, the WannaCry ransomware program has evolved to incorporate new penetration methods, new methods for scanning a computer to identify vulnerable data to encrypt, and new methods for identifying attack targets. Additionally, as computer programmers develop new anti-virus programs to combat malware, malware programmers code new work-arounds in response to the anti-virus software.

Most significantly, malware authors frequently use automated code transformers to create a flood of malware with the explicit purpose of overwhelming the team of malware analysis working to extract signatures. Using transformers known as polymorphic engines and packers (amongst others) malware authors take an original malware program and create another program that does the same thing, but has a different byte pattern of code. Such transformations defeat anti-malware scanners since the signatures they use are based on specific byte patterns that a human analyst would have deemed as a good indicator of a particular malware. Attackers also use a variety of anti-sandbox techniques to defeat sandboxes as well as use anti-disassembly techniques to defeat disassemblers.

Recent advances in artificial intelligence and machine learning have led to a new breed of anti-virus technologies. These technologies "learn" signatures of malware, from a large corpus of malware and benign programs. Though effective, these technologies are also not impenetrable. Further, such technologies currently only answer one question for a malware analyst—is a given file malicious? They do not help answer other equally important questions, such as, what does this malicious program do; who is the threat actor behind the malware; what other malware has been written by the said threat actor, and what IoCs can be used to detect whether a similar malware has breached the defenses? To evaluate these questions, malware analysts must still manually analyze a malware and create signatures using IoCs and Techniques, Tools, and Procedures ("TTP"s) for particular threat actors.

SUMMARY OF THE INVENTION

Herein disclosed is a method to automatically create signatures from one malware or collection of malware, such as those belonging to the same family. This method is innovative because it leverages the fundamentals of malware economics against the attacker. Malware authors must reuse code to amortize the cost of developing malware and must create a large number of variants automatically in order to increase the odds of bypassing malware detectors. The inventive method takes advantage of the two necessities of an attacker—sharing of code between malware and the automated generation of a large number of variants—to automatically identify byte patterns that can serve as a signature of the given malware or a collection of malware.

Methods for determining similar malware code even when the code is obfuscated are presently known in the art, specifically as disclosed in U.S. patent application Ser. No. 14/143,823. Having found similar code, the present invention teaches a method to create signatures from the machine instructions of similar code. The present invention provides byte code signatures that a user may create from one or more samples of malware, and use the signature to scan a computer.

This invention also addresses a need not currently served in the industry even with the new AI and machine learning based technologies for detecting malware. While present technologies can determine whether a file is malicious, they do not differentiate between malware from different families. More importantly, for law enforcement purposes, their "verdict" may not stand scrutiny in the court of law since the reasoning they use to provide a verdict is hidden inside the program and is not presentable in human understandable form. In contrast, the signatures created by this invention are based on code, an artifact that can be directly associated to a specific capability of a program and its purpose. Similar code also provides stronger evidence for attribution since it is known that programs often capture in their structure the unique style of individual programmer.

DETAILED DESCRIPTION OF THE INVENTION

Given a first large collection of known malicious and known benign programs, and given a second collection of one or a handful of malware known to be similar or from the same family, a signature can be constructed from the disclosed inventive method to detect variants of the malware in the second collection. One benefit of the disclosed system is that the signatures it generates have a very low probability for matching a benign program, including one that is not known (i.e., not in the database). An additional benefit is that when a signature matches a file, there is a very high probability that the matched file is either a variant of the second collection malware or the matched file may also be from other malware families with which the second collection shares code.

The system herein comprises three primary components that make up its architecture: (1) a system that populates a Procedure Database using semantic indexes (herein referred to as the Semantic Indexer); (2) a system that constructs the malware signature (herein referred to as the Signature Generator); and (3) a system that provides a database of semantically similar procedures (herein referred to as the Procedure Database). This architecture is depicted in FIG. 1.

The Semantic Indexer takes, as input, programs identified as malicious or benign. The Semantic Indexer disassembles a program, breaks it into procedures, and breaks each procedure into blocks. For each block, the Semantic Indexer computes the semantics. It further generalizes the semantics of each block to create a canonical string representation in which registers and constants are replaced by generic labels (e.g., A, B, C, etc.). The replacement is done to ensure consistency-that is, the two or more instances of the same register (similarly, constant) is replaced by the same label. Semantic Indexer uses the canonical representation of the each block of a procedure to construct a canonical representation for the entire function. It uses this representation to compute an index for each procedure, and stores each procedure in the Procedure Database at the index. It is important that the canonical representations be created such that when two procedures produce the same index, they are semantically similar. This process can be conducted using the teaching of U.S. patent application Ser. No. 14/143,823

Each procedure in the Procedure Database has also associated with it a tag that can take one of two values—benign or malicious—depending on whether it was extracted from a malicious program or a benign program. Semantic Indexer populates the Procedure Database with appropriate tables needed to find all the procedures belonging to a program, to find all programs that contain a procedure, and to find all procedures with the same semantic index.

Given a computer program and an associated tag whether it is malicious or benign, the Procedure Database is populated as follows. First, the computer program is disassembled, and that disassembled code is then broken into procedures. The procedures are then each broken into blocks of code such that the blocks do not overlap in memory. The semantics of each block of code is then computed, where the semantics summarizes the effect a block of code has on the registers and memory of the computer processor. The semantics are further abstracted to create a canonical representation by consistently replacing registers or constants in the semantics by new labels. Using the canonical representation of each block, a canonical representation of the procedure is computed. Next, a semantic index is computed for a procedure using the canonical representation of the procedure. A procedure and its associated information is stored in the Procedure Database using the procedure's semantic index. The Procedure Database is capable of handling more than one procedure record per semantic index. In the procedure record, at least the following information is maintained for each block of the procedure: the block's start and end address; its code; its semantics; and its canonical representation. Last, each procedure is assigned a tag-malicious or benign-depending on the tag of the program from where it was extracted.

Figure 2:
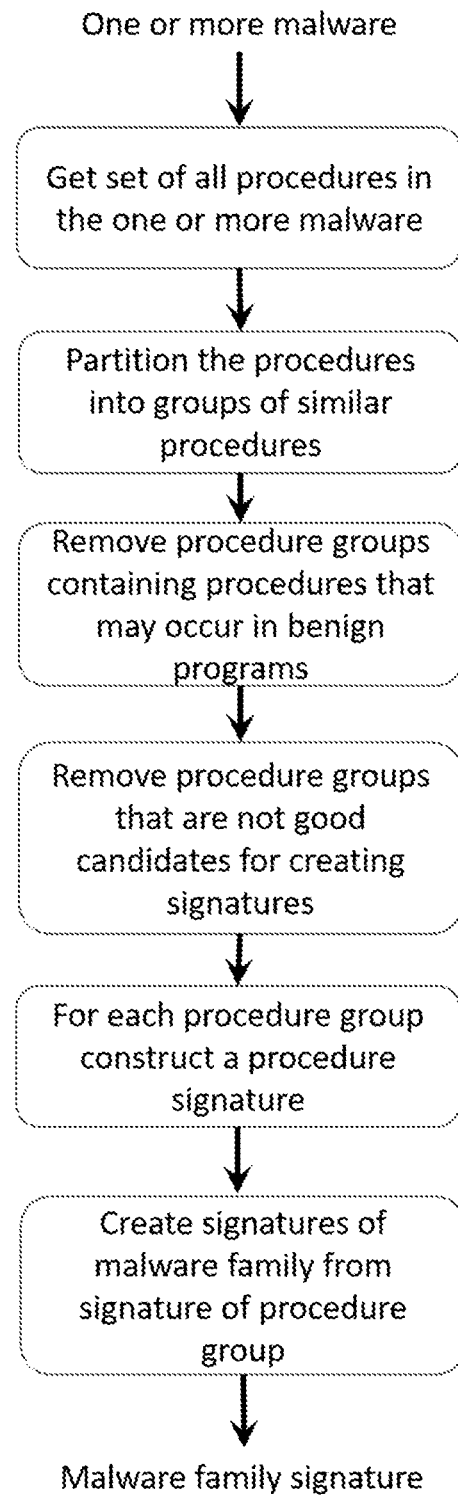
FIG. 2 provides a diagram of the disclosed method of constructing signature for one or more malware.

The Signature Generator takes as input a collection of one or more malware that are similar, such as those belonging to the same malware family. Such a collection itself may have been found by searching the Procedure Database, through manual analysis, or other means. To construct the signature, the Signature Generator creates a set of all the procedures in the collection of malware and then partitions this set into groups, such that each group contains procedures with the similar semantics. The Signature Generator then removes a procedure group if a procedure from the group may appear in a benign program. This is done to reduce or remove the possibility of false positives, since signatures created using such procedures may also match benign programs. From the remaining groups, the Signature Generator further removes those groups of procedures that may not be good candidates for creating signatures. Reasons why certain groups may not be good candidates include, but are not limited to: the group contains procedures that do not distinctively represent the collection of malware for which signature is being created; or the group may be redundant since the procedures in the group are correlated with another group. The Signature Generator then computes the procedure signatures, one signature for each of the remaining group of procedures. Then, it combines these procedure signatures to construct the signature for the collection of malware. This procedure is depicted in FIG. 2.

The methods of disassembling a computer program, breaking it into procedures, and breaking each procedure into blocks of code are known in the art, and do not need further explanation. The methods for computing semantics of a block of code, then abstracting it to create a canonical form, and then creating semantic indexes have been described in U.S. patent application Ser. No. 14/143,823. Computing the signature for a collection of malware is generally performed as follows. When there is a collection of one or more malware known to be similar, first get the set of all procedures in the collection and partition the set of all procedures into a group(s) of similar procedures that could appear in benign-ware. This step is routine and well known in the art; the following remaining steps are novel and inventive. Next, remove from the partition all groups of similar procedures that could possible appear in benign-ware. Then remove groups of semantic procedures that are poor candidates for creating signatures. For each group of the remaining semantically similar procedures a signature is constructed. Then a signature is constructed for the one or more malware by combining the signatures of the selected procedures.

Figure 3:
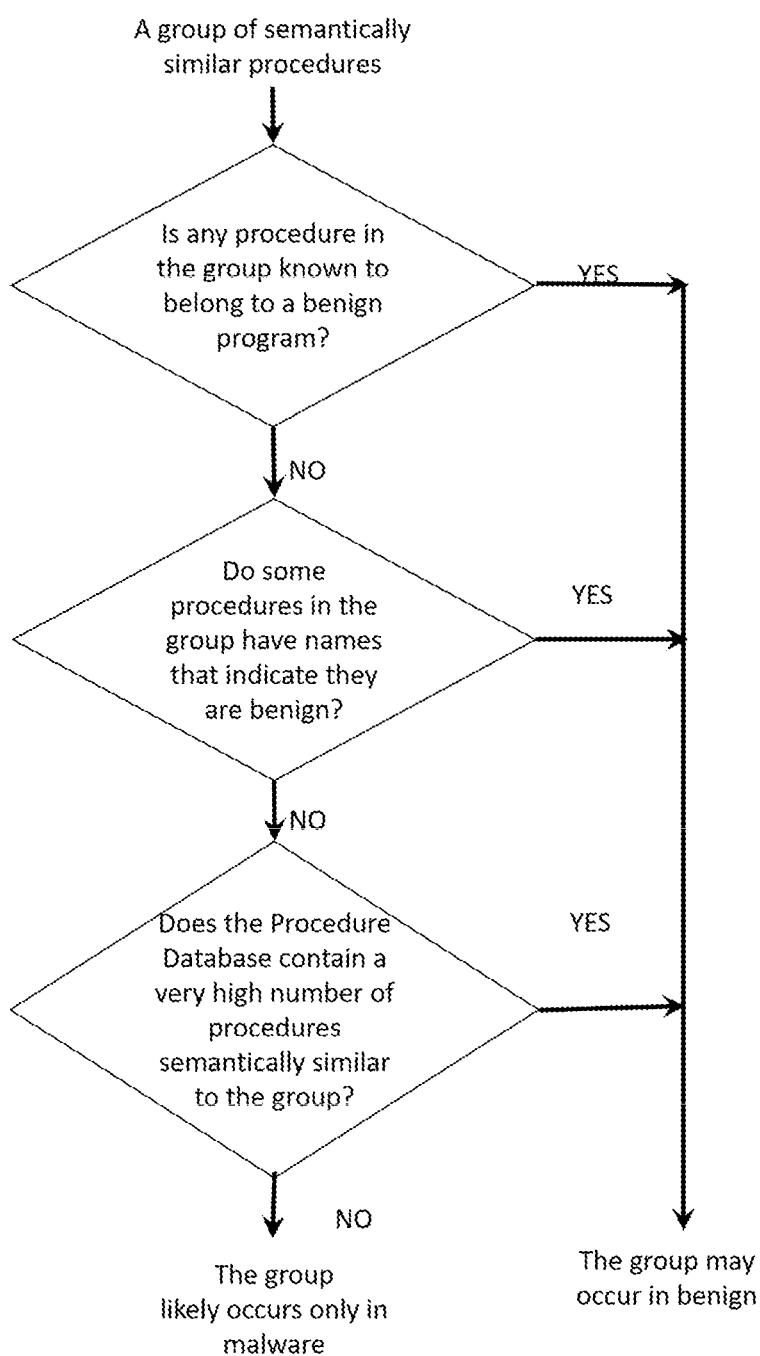
FIG. 3 provides a diagram of the testing method to determine if a group of similar procedure should be deemed benign.

Testing if a group of semantically similar procedures could appear in benign-ware. It is critical that the signatures produced by the Signature Generator produce very few false positives. Otherwise, analysts would be so overwhelmed with matches that they would need to manually sort through the results to eliminate false positives, negating the benefits of creating signatures. Given the high usage of open source and similar code in both benign-ware and malware, there is a high likelihood that signatures created using procedures that also appear in benign programs would produce false positives. Herein, a number of tests are disclosed to determine whether a group of similar procedures taken from the collection of malware may be benign. These tests are shown in FIG. 3. These testing methods take advantage of the Procedure Database, the database of procedures constructed from malware and benign programs. An embodiment of the invention may use one or a combination of the disclosed methods to filter out procedures form being used to create signatures.

One embodiment of the invention may, as a matter of extreme precaution, consider a group of similar procedures from the malware collection under analysis to be benign if any procedure in the group is similar to a procedure extracted from a benign program in the Procedure Database. Since it is infeasible to construct a database of all possible benign programs, known and yet to be developed, this cannot be done for all benign programs. Yet, it does provide a quick mechanism for removing from consideration procedures that may be found in very common programs such as Microsoft Office, Microsoft Windows, Adobe products, Linux and many others, or programs that may be common to a particular company or any industry.

In another embodiment of the invention a procedure group may be treated as benign and removed from consideration even when the Procedure Database does not contain an example procedure that appears in a benign program. Such an embodiment may take advantage of the high volume of malware known in-the-wild. Based on economics of writing malware, it is expected that any procedure occurring in one malware family may also be similar to procedures in other malware families. However, if a procedure group is semantically similar to a significantly large number of procedures in the Procedure Database, it may be safe to consider that procedure group as benign. This is because malware developed by disconnected groups may still share code because they may use the same tool chains and libraries as those used for developing benign programs. Thus, if a group of procedures is semantically similar to a very large number of procedures in the Procedure Database, we may consider the group as benign even if all of the procedures it contains are from known malware.

In another embodiment of this invention whether a group of procedures is benign may be determined by utilizing the knowledge that most malware are "stripped" binaries, meaning that their binaries have been stripped of symbol tables and debug information. Sometimes malware may not be stripped, but may have garbled names in the symbol table, such as for Android and Java malware. Thus, if a group of similar procedure matches a procedure that is not stripped and have meaningful names, it may be safe to consider it as benign.

In yet another embodiment whether a procedure is benign may be determined using machine learning. In this embodiment, a machine learning system may be trained using methods known in the art to classify procedures into the two categories: malware or benign. Use of machine learning for such binary classification and mechanisms for training are well known in the art and need not be expanded upon.

Figure 4:
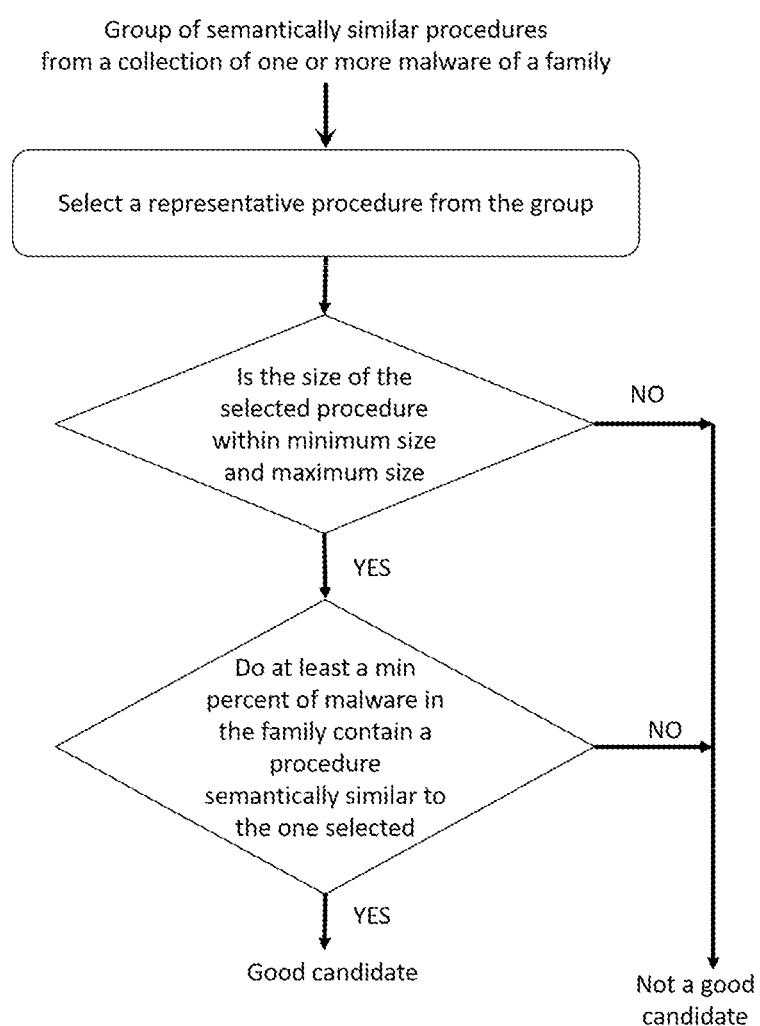
FIG. 4 provides a diagram of the testing method to determine if a group of procedures is a good candidate to make signatures.

Testing if a group of semantically similar procedure is a good candidate for creating signatures. After filtering out the groups of procedures that could be benign, there could still be 10s or 100s of procedure groups remaining. Using all of these procedure groups to create signatures would be inefficient. For one, the more the number of signatures, the more time it would take to scan the system for all the signatures. Second, because of the mutual dependence of procedures in a program, the procedure groups are likely to be correlated, so if one procedure is present, some other will also most likely be present. Thus, it is desirable to use a small number of procedure groups such that the number of procedure signatures created will be small. The method for meeting these goals is shown in FIG. 4.

The size of a procedure group may be measured using different metrics. For instance, the size may be the number of bytes of machine code in a representative procedure in the group. It may also be measured using the number of blocks in the CFG of the procedure, or the number of instructions. There may be other measures of size as well in other embodiments. The key requirement is that the resulting signature be small enough, whilst also not generate false positives. Thus a procedure group may be selected if it is not too small and not too big, using various measures, such as its number of bytes of machine code, or number instructions, or number of blocks.

The determination of what size is too small or what is too large may be performed by conducting experiments to find the right trade-off between the number of false positive errors and the signature scanning time, using testing procedures known in the art. As the size of signature increases the number of false positive errors will decrease and the signature scanning time will increase. The appropriate size will depend upon the system in which this method is being applied by the user.

In addition to low false positive errors, it is also desirable that signatures have low false negative errors. A false negative error occurs when a signature created from one variant of a malware does not detect another, very close, known variant. To ensure the signature is not too limiting, i.e., where it only matches a single or very few variants, procedure groups that occur in many variants of in the malware collection should be given preference over those that occur only in one or a few variants. It may not be desirable to require that a selected procedure occurs in all malware of the collection either, for that may prevent detection of future variants. Thus, procedure groups may be selected such that they occur in some proportion of the malware collection.

The selection of a particular proportion of malware a procedure group must occur for it to be included for constructing signature influences the ratio of false positives and false negative errors associated with the resulting signatures. When the proportion is close to zero or smallest, the false positives are the highest and the false negatives the lowest. As the proportion is increased, the false positives would reduce, but the false negatives would increase. The changes in the two errors are typically not linear with the change in proportion. There is typically an inflection point. In the beginning as the proportion is increased, the false positives will decrease linearly, while the false negatives may not decrease at all or reduce at a much lower rate. As a certain point, the false positives will stop decreasing or stabilize, while the false negatives will start increasing more rapidly. This inflection point is determined through empirical experimentation, using methods known in the art.

In addition, a group of procedure may be selected if it adds new information. If the group under consideration is highly correlated to a group already selected, it may not be prudent to select it.

Figure 5:
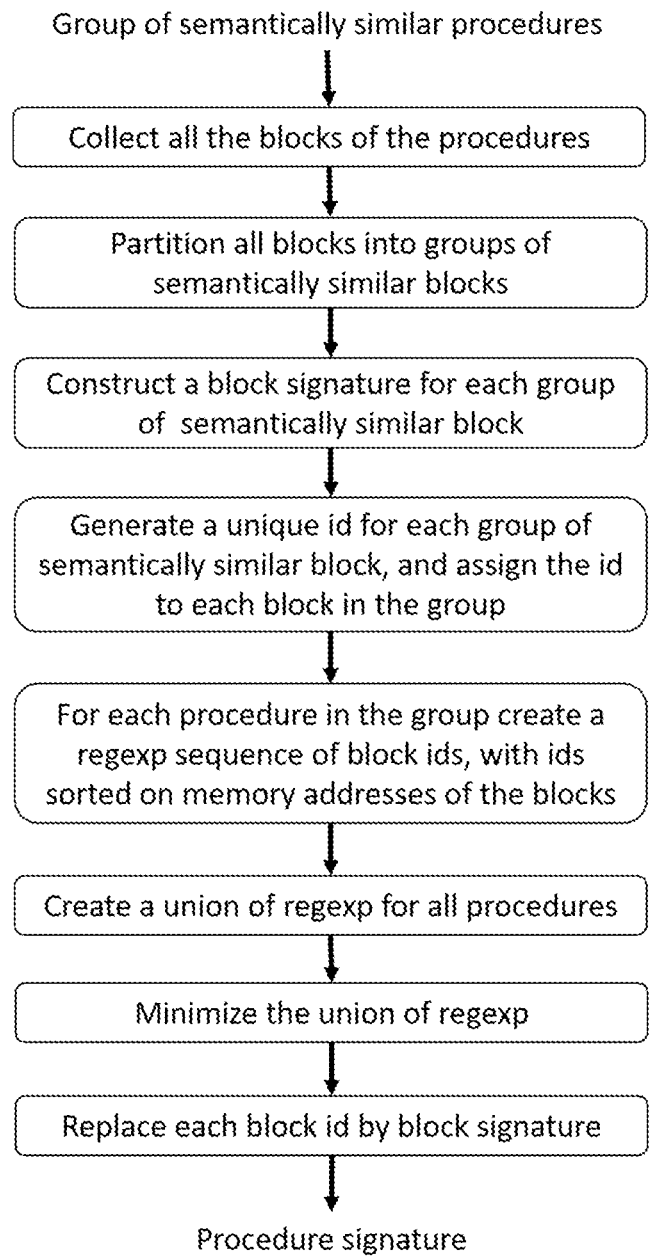
FIG. 5 provides a diagram of the disclosed method to construct signature of a procedure.

Constructing procedure signature. The next step is to construct the procedure signatures for each group of similar procedures selected for constructing signature, which comprises three general steps. First, construct a regular expression for each procedure in the group. Next, create a single regular expression for the entire group. Last, create a signature for the group of procedures. A diagram of this process can be seen in FIG. 5.

To construct the regular expression for each procedure in the group, the blocks of code from all procedures in the group are collected and partitioned into groups of blocks with similar semantics. This step establishes a connection between the similar blocks across different procedures in the group as well as similar blocks within a single procedure. Next, each group of similar blocks is given a unique identifier (e.g., 1, 2, 3, etc.). The specific mechanism of giving the identifier can be selected according to user preference or some other function selected by the user, provided that two different groups of similar blocks are not assigned the same identifier. The identifier associated to a group of similar blocks is then assigned to each individual block in the group. For each procedure in a procedure group, a sequence of block identifiers is created. This sequence is created by ordering the blocks of the procedures as they occur in the program memory (or file), and then replacing each block by its identifier.

This significant step enables aligning similar code in two or more different procedures. These procedures, being similar, may compute the same function but do so using different ordering of code blocks. They may even share some blocks with similar semantics, but differ on others. By giving the same identifier to blocks with similar semantics and creating a sequence, we enable aligning code sequences in otherwise different programs. A sequence of identifiers created for each procedure can also be viewed as a regular expression over the alphabet of unique identifiers. Thus, this step enables the creation of a set of regular expressions, one for each procedure in the group. Each regular expression represents one pattern of steps for computing a function as the code is laid out in memory. Collectively, the set of regular expressions represents a variety of different ways the same function may be computed and how the code may be organized. Using methods known in the art, the set of regular expressions is minimized to construct a singular regular expression.

It is also well known in the art that consecutive blocks of code a procedure may not be contiguous in memory. That is, there may be a "gap" in where one block of code ends and the next block of code starts. There are many different ways how gaps between blocks may be encoded in the regular expressions. In one embodiment such gaps may be encoded in the regular expression of a function using a special symbol that represents "anything" and a cardinality representing the size of the gap. For example, the symbol "." represents "anything" in regular expressions created in the Linux operating system. A collection of such regular expressions, each consisting of a sequence of identifiers possibly separated with the special symbol for gap and cardinality, can be minimized using methods known in the art.

Having created a single regular expression that represents a variety of different ways blocks of code may be organized in memory to compute a similar function, to construct a byte code based signature, the regular expression of each identifier is replaced by the signature of the corresponding collection of blocks, whose construction is described below.

Constructing Block Signature.

Figure 6:
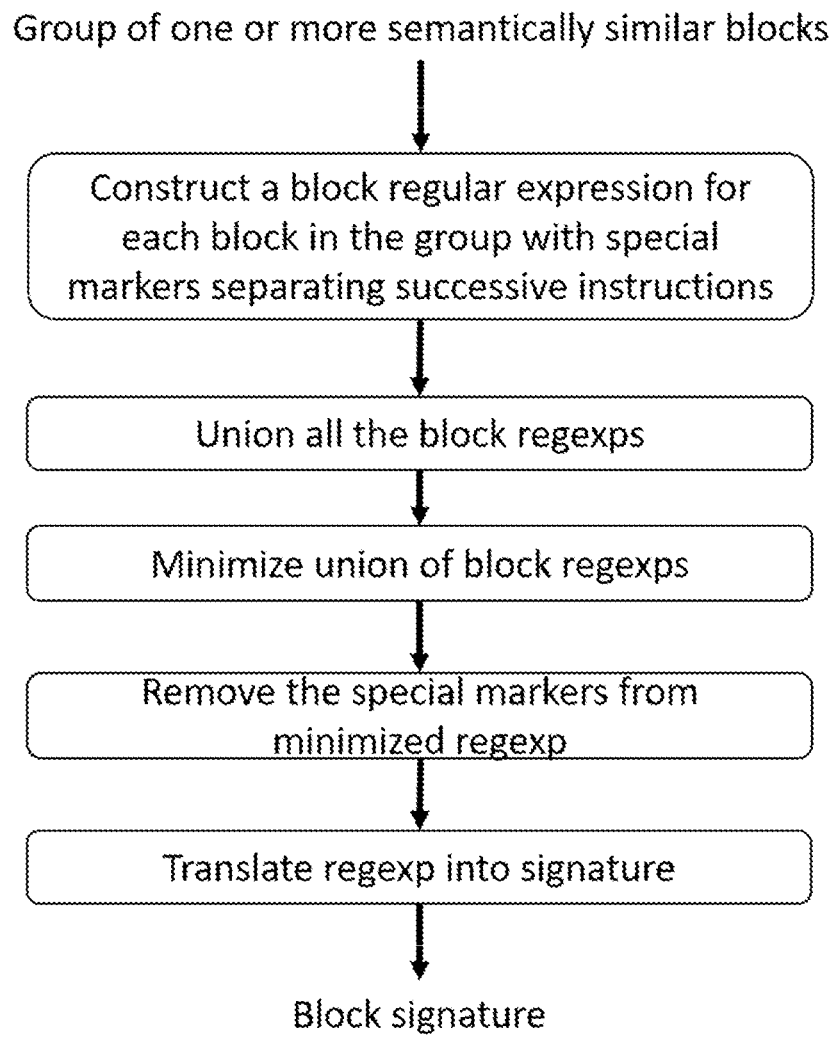
FIG. 6 provides a diagram of the disclosed method to construct signature of a block of code.

Two blocks are semantically similar if they perform computation that for similar input state produce similar output state. Two states are similar if consistently renaming the registers and memory addresses of one state will yield the other state. Thus, the instructions in the two similar blocks of code do the same work, except that they may use different registers and memory locations. A diagram of this process can be seen in FIG. 6.

Now disclosed is the method for computing the signature of one or more similar blocks of code. The goal is that the signature can be used to scan memory, files, and network packets, without any preprocessing. Hence, the signatures must be constructed using the actual bytes of the blocks of code, and not any abstraction of the bytes. The creation of such byte code signature is an important component of this invention.

For each block in the collection of blocks, a sequence of hexadecimal numbers representing the actual bytes of its machine code is created. Then, each sequence of hexadecimal numbers is punctuated with special markers at the boundaries between successive instructions. All the instruction markers use the same symbol, and the marker is chosen such that it is distinguishable from the hexadecimal numbers. Each sequence of hexadecimal numbers punctuated with special markers is next treated as a regular expression. The collection of hexadecimal numbers, one per similar block in the collection, represents a variety of different ways to perform the similar computation represented by the collection of blocks. Using methods known in the art, the collection of regular expression is minimized to construct a singular regular expression. The regular expression is then translated into a signature by removing the special markers and translating the expression into the appropriate signature language, such as Yara or a similar language.

Construct Signature of Malware from Signature of Procedure.

The previous steps have described methods to select groups of one or more similar procedures (from one or more similar malware) and to construct byte code signatures for each group of procedure. The final step is to use these collections of signatures created from the selected group of procedures to create a signature for the one or more similar malware.

Constructing the malware signature requires creating rules as to how to combine the various procedure signatures to detect variants of the one or more malware. There are a variety of many ways to construct such a rule, and each such rule may have different levels of false positives and false negatives. The choice then depends on the strength of the desired rule. A rule may be constructed to require that if any one of the procedure signatures matches on a file, that rule is considered matched (called the OR rule). Alternatively, a rule may also be constructed to require that all of the procedure signatures must match on file for that rule to be considered matched (called the AND rule). Clearly, an OR rule will match on all the files for which the corresponding AND rule matches, but not vice-versa. A rule may also be constructed to require some fraction of the procedure signatures to match (called the SOME rule). Of course, more complex rules can be created by combining AND, OR and SOME rules.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Modifications, additions, or omission may be made to the systems, apparatuses and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to a member of a set or each member of a subset of a set.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A method for creating and detecting a signature for a collection of one or more malware comprising:
   providing a system comprising:
   a Semantic Indexer;
   a Procedure Database; and
   a Signature Generator;

wherein the Semantic Indexer populates the Procedure Database;
wherein the Procedure Database stores two or more semantically similar procedures;
wherein the Signature Generator generates signatures for the one or more malware;
computing semantic indexes for procedures of one or more programs, and storing said procedures in the Procedure Database;
collecting a set of all procedures in a collection of the one or more malware for which to create signatures;
partitioning the set of all procedures of the one or more malware into groups of semantically similar procedures;
removing from the partition the groups of semantically similar procedures that are not good candidates for creating signatures;
constructing a signature for each of the groups of semantically similar procedures remaining in the partition;
constructing a regular expression for each procedure in the group, comprising:
collecting all blocks of code in the group of semantically similar procedures;
partitioning the collection of blocks of code into groups of semantically similar blocks of code;
constructing a block signature for each group of semantically similar blocks of code;
generating a unique identifier for each group of semantically similar blocks of code and assigning the identifier to each block in the group;
creating a regular expression sequence of block identifiers for each procedure in the group of one or more semantically similar procedures, comprising block identifiers in the sequence sorted on the memory address of the blocks;
creating a single regular expression for an entire group of one or more procedures, comprising:
creating a union of all procedure regular expressions; and
minimizing said union of all procedure regular expressions; and
creating a signature for the group of similar procedures, comprising constructing a procedure signature by replacing each block identifier with block signature of the corresponding group of similar block of code; and
combining the signatures of the selected semantically similar procedures to construct the signature of the one or more malware.

2. The method of claim 1, wherein the method for computing semantic indexes for procedures of one or more programs comprises:
disassembling the program;
breaking the disassembled program into one or more procedures;
breaking each said procedure into one or more blocks of code such that said blocks do not overlap in memory;
computing a semantics of each said block of code;
computing the semantic index for each procedure;
storing a procedure information record in the Procedure Database; and
assigning a tag to each procedure identifying the procedure as malicious or benign;
wherein each semantic index in the Procedure Database maintains one or more procedure records.

3. The method of claim 2, wherein the each procedure information record comprises, for each block of code:
a start address for the block of code;
an end address for the block of code;
the instructions in the block of code; and
the semantics of the block of code.

4. The method of claim 1, wherein semantic indexes are computed using canonical representations of semantics of one or more blocks of the procedures of one or more programs.

5. The method of claim 1, wherein groups of semantically similar procedures that may appear in benign-ware are not good candidates for creating signatures.

6. The method of claim 1, wherein the group of semantically similar procedures is a good candidate for creating signatures if the size of a procedure selected is appropriately sized.

7. The method of claim 6, wherein the size of the procedure is measured according to the number of bytes in the procedure's code.

8. The method of claim 6, wherein the size of the procedure is measured according to the number of machine instructions contained in the procedure's code.

9. The method of claim 6, wherein the size of the procedure is measured according to the number of blocks of code in the procedure.

10. The method of claim 6, wherein a machine learning system is trained to identify whether the procedure is malware or benign.

11. The method of claim 1, wherein a group of semantically similar procedures is a good candidate for creating signatures if the group covers a certain minimum percentage of the one or more malware for which signature is being created.

12. The method of claim 1, wherein a group of semantically similar procedures is a good candidate for creating signatures if the group of semantically similar procedures is not highly correlated to a group of semantically similar procedures already selected.

13. The method of claim 1, wherein a method for automatically constructing a signature for a group of one or more semantically similar procedures comprises:
constructing a regular expression for each procedure in the group of one or more procedures;
creating a single regular expression for an entire group of one or more procedures; and
creating a signature for the group of one or more similar procedures.

14. The method of claim 1, wherein a method for constructing a signature for a group of one or more blocks of code that are semantically similar comprises:
creating a sequence of hexadecimal numbers representing the instructions in the one or more blocks of code, with the said sequences punctuated using a special marker to mark instruction boundaries;
constructing a regular expression comprising a union of all sequences of hexadecimal numbers punctuated with special markers;
minimizing the regular expression;
removing from the regular expression one or more special markers identifying instruction boundaries; and
translating the regular expression into a sequential signature.

15. The method of claim 1, wherein a signature of malware is constructed by constructing one or more rules as follows:

of a subset of one or more of the procedure signatures, any one must appear;

of a subset of one or more of the procedure signatures, all must appear; or of a subset of one or more of the procedure signatures, at least a certain proportion must appear; or any combination of these criteria.

16. The method of claim 1, where a regular expression for each procedure comprises one or more sequence block identifiers separated by a symbol denoting a gap in memory between consecutive blocks of code.

17. The method of claim 1, wherein groups of semantically similar procedures that may appear in benign-ware are not good candidates for creating signatures, and wherein a group of semantically similar procedures may occur in benign-ware if one or more procedure in the group is known to belong to a benign program.

18. The method of claim 1, wherein groups of semantically similar procedures that may appear in benign-ware are not good candidates for creating signatures, and wherein a group of semantically similar procedures may occur in benign-ware if one or more procedures in the group has a name that indicates it may be benign.

19. The method of claim 1, wherein groups of semantically similar procedures that may appear in benign-ware are not good candidates for creating signatures, and wherein a group of semantically similar procedures may occur in benign-ware if the Procedure Database contains a very high number of procedures semantically similar to the group.

* * * * *